US011403337B2

(12) United States Patent
Peterson (10) Patent No.: US 11,403,337 B2
(45) Date of Patent: Aug. 2, 2022

(54) IDENTIFYING VIDEOS WITH INAPPROPRIATE CONTENT BY PROCESSING SEARCH LOGS

(71) Applicant: Google LLC, Mountain View, CA (US)

(72) Inventor: Scott Peterson, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 427 days.

(21) Appl. No.: 15/832,446

(22) Filed: Dec. 5, 2017

(65) Prior Publication Data

US 2019/0171723 A1   Jun. 6, 2019

(51) Int. Cl.
*G06F 16/48*   (2019.01)
*G06F 16/438*   (2019.01)
*G06F 16/951*   (2019.01)
*G06F 16/55*   (2019.01)

(52) U.S. Cl.
CPC ............ *G06F 16/48* (2019.01); *G06F 16/438* (2019.01); *G06F 16/55* (2019.01); *G06F 16/951* (2019.01)

(58) Field of Classification Search
CPC ........ G06F 16/48; G06F 16/55; G06F 16/438; G06F 16/951
See application file for complete search history.

(56) References Cited

U.S. PATENT DOCUMENTS 8,037,042 B2   10/2011   Anderson et al.
9,723,367 B1   8/2017   Long et al.
2010/0235452 A1*   9/2010   Fukasawa ............... H04L 51/30
                                                                        709/206
2012/0150850 A1   6/2012   Parthasarathy et al.
2012/0158638 A1*   6/2012   Churchill ............... G06Q 10/00
                                                                        706/52

(Continued)

FOREIGN PATENT DOCUMENTS

EP        2244195 A2     10/2010
WO   WO2005101249        10/2005
WO     2007005382 A2      1/2007

OTHER PUBLICATIONS

PCT, International Search Report and Written Opinion for International Application No. PCT/US2018/051234, dated Apr. 18, 2019, 12 pages.

*Primary Examiner* — Ashish Thomas
*Assistant Examiner* — Dustin D Eyers
(74) *Attorney, Agent, or Firm* — Lowenstein Sandler LLP (57) ABSTRACT

A method for classifying media content is disclosed. The method includes identifying, by a processing device, a plurality of search results corresponding to a search query, the plurality of search results corresponding to a plurality of media items; identifying, by the processing device, at least one first media item and a second media item of the plurality of media items, the first media item being associated with a first content label, the second media item being associated with a second content label; determining, based at least in part on a first user interaction with the first media item, whether the search query represents a request for media content associated with the first content label; and in response to determining that the search query represents the request for media content associated with the first content label, associating, by the processing device, the second media item with the first content label.

20 Claims, 6 Drawing Sheets

(56) References Cited

U.S. PATENT DOCUMENTS

| | | | | |
|---|---|---|---|---|
| 2013/0074114 A1* | 3/2013 | Liu | .................... | H04N 21/4755 |
| | | | | 725/28 |
| 2014/0108302 A1* | 4/2014 | Chang | ..................... | G06F 16/68 |
| | | | | 706/11 |
| 2014/0282099 A1* | 9/2014 | Bronder | .................. | G06F 16/54 |
| | | | | 715/753 |
| 2015/0019461 A1* | 1/2015 | Simard | ................... | G06F 40/30 |
| | | | | 706/11 |
| 2015/0169952 A1* | 6/2015 | O'Malley | ............ | G06K 9/6255 |
| | | | | 382/225 |
| 2016/0004699 A1* | 1/2016 | Liu | ..................... | H04N 21/251 |
| | | | | 707/734 |

* cited by examiner

IDENTIFYING VIDEOS WITH INAPPROPRIATE CONTENT BY PROCESSING SEARCH LOGS

TECHNICAL FIELD

This disclosure generally relates to the field of content sharing platforms, and in particular, to identifying videos with inappropriate content by processing search logs relating to media items.

BACKGROUND

Content sharing platforms allow users to upload, view, and share content, such as video content, image content, audio content, and so on (which may be collectively referred to as "media items", "media content", "content items", or "content"). Such media items may include audio clips, movie clips, TV clips, and music videos, as well as amateur content such as video blogging, short original videos, pictures, photos, other multimedia content, etc. Users may use computing devices (such as smart phones, cellular phones, laptop computers, desktop computers, netbooks, tablet computers) to use, play, and/or consume media items (e.g., watch digital videos, listen to digital music, read articles, etc.). Some content may have an assigned content rating, which serves as an indication as to the age appropriateness of the content.

SUMMARY

The following is a simplified summary of the disclosure in order to provide a basic understanding of some aspects of the disclosure. This summary is not an extensive overview of the disclosure. It is intended neither to identify key or critical elements of the disclosure, nor to delineate any scope of the particular implementations of the disclosure or any scope of the claims. Its sole purpose is to present some concepts of the disclosure in a simplified form as a prelude to the more detailed description that is presented later.

In one implementation, a method for classifying media content is disclosed. The method may include: identifying, by a processing device, a plurality of search results corresponding to a search query, the plurality of search results corresponding to a plurality of media items; identifying, by the processing device, at least one first media item and a second media item of the plurality of media items, the first media item being associated with a first content label, the second media item being associated with a second content label; determining, based at least in part on a first user interaction with the first media item, whether the search query represents a request for media content associated with the first content label; and in response to determining that the search query represents the request for media content associated with the first content label, associating, by the processing device, the second media item with the first content label.

In some implementations, determining whether the search query represents the request for media content associated with the first content label includes: identifying at least one second user interaction with the second media item; and determining, based at least in part on the first user interaction and the second user interaction, whether the search query represents the request for media content associated with the first content label.

In some implementations, determining whether the search query represents the request for media content associated with the first content label includes: determining a first number of user interactions with the at least one first media item; determining a second number of user interactions with the second media item; and determining, based at least in part on the first number and the second number, whether the first search query represents a request for media content associated with the first classifier.

In some implementations, the method further includes determining a weight factor representative of a ratio of the first number to a sum of the first number and the second number; and comparing the weight factor with a first threshold.

In some implementations, determining whether the search query represents the request for media content related to the first content label includes: identifying, from the plurality of media items corresponding to the search query, a third number of media items that are associated with the first content label; and determining whether the third number is greater than a second threshold.

In some implementations, the method may further include associating the first media item with the second content label in response to determining that the search query does not represent the request for media content associated with the first content label.

In some implementations, the first content label indicates a first content rating (e.g., a content rating associated with explicit content or any other inappropriate content), and the second content label indicates a second content rating (e.g., a content rating associated with content suitable for general audience or children).

In one implementation, a system for classifying media content is disclosed. The system may include a memory; and a processing device communicatively coupled to the memory, wherein the processing device is to: identify a plurality of search results corresponding to a search query, the plurality of search results corresponding to a plurality of media items; identify a first media item and a second media item of the plurality of media items, the first media item being associated with a first content label, the second media item being associated with a second content label; determine, based at least in part on a first plurality of user interactions with the first media item, whether the search query represents a request for media content associated with the first content label; and in response to determining that the search query represents the request for media content associated with the first content label, associate the second media item with the first content label.

In one or more of the disclosed implementations, computing devices for performing the operations of the above described implementations are also disclosed. Additionally, in implementations of the disclosure, a machine-readable storage medium stores instructions for performing the operations of the above described implementations.

BRIEF DESCRIPTION OF THE DRAWINGS

The present disclosure is illustrated by way of example, and not by way of limitation, in the figures of the accompanying drawings, in which.

DETAILED DESCRIPTION

Implementations are described for identifying media items with inappropriate content based on search logs. Media items (e.g., videos) on a content sharing platform may be associated with various content labels that represent ratings (e.g., age appropriateness ratings) of the media items. For example, a media item may be assigned a content label indicating suitability for a particular audience, such as "Y" (young), "G" (general), "PG" (parental guidance), "TEEN" (teenager), "MA" (mature audience), and "X" (adult/X-rated). A search server or a content server may provide content searches for particular users (e.g., children) by restricting search results based on content labels. For example, both "Y"-rated (e.g., youth-oriented) and "G"-rated (e.g., general audience) content may be generally considered to be safe for children. The search server and/or the content server can provide search results associated with "Y"-rated content and "G"-rated content in response to receiving a search query for media content suitable for children.

Conventional solutions for determining ratings of media items typically use trained models to rate media items based on metadata about the media items (e.g., titles, descriptions, keywords, etc.). The conventional solutions may also rate media items based on features of video frames of the media items. However, the conventional solutions may not be able to create accurate ratings if content creators provide false or misleading information about the media items. For example, a content creator may intentionally provide keywords associated with "safe" (appropriate for children) content when uploading a video including explicit content to a content sharing platform. The content creator may also intentionally insert video frames including "safe" content into the video to be uploaded. As such, the video containing explicit content may be incorrectly classified by the conventional solutions as a "safe" video.

Aspects of the present disclosure address the above deficiencies by providing a content rating component that can determine ratings for media items based on search query data. The content rating component can automatically perform automated analysis on search query data to rate media items related to the search query data. For example, the content rating component can analyze search query data associated with search queries for media content (e.g., search queries submitted to a search server or a content server in a predetermined period time) to identify search results corresponding to each of the search queries, media items associated with the search results, and content labels associated with the media items.

The content rating component can then determine whether each of the search queries represents a request for particular content (e.g., "X"-rated content) based on the analysis. For example, content rating component can determine that the search results of a particular search query include a certain number of videos associated with a first content label (e.g., "X"-rated videos) and a certain number of videos associated with one or more other content labels (e.g., "Y"-rated videos, "G"-rated videos, and/or other videos that are regarded as "safe"-rated content). The content rating component can further determine a first plurality of user interactions with (e.g., selections of) the "X"-rated videos and a second plurality of user interactions with (e.g., selections of) the "safe"-rated videos. In some embodiments, the content rating component can determine a weight factor indicative of a ratio of the number of user interactions with the "X"-rated videos to the number of user interactions with the "X"-rated videos and the "safe"-rated videos. In some embodiments, the content rating component can determine that the search query represents a request for "X"-rated content in response to determining that the weight factor is greater than a first threshold and/or that the number of the "X"-rated videos is greater than a second threshold. In some embodiments, the content rating component can change the "safe" rating of videos to the "X" rating in response to determining that the search query represents a request for "X"-rated content. Alternatively, the content rating component can change the "X" rating of videos to the "safe" rating in response to determining that the search query does not represent a request for "X"-rated content.

Accordingly, aspects of the present disclosure provide for technical solutions to rate media items in an accurate and efficient manner. In particular, the technology disclosed herein may accurately rate media items regardless of misleading data provided by creators of the media items, and may also correct ratings of media items that may be misclassified by conventional content rating techniques. This increases the reliability of content sharing platforms, and reduces or eliminates the need for additional operations to check the results of such techniques and perform corrective actions when the results are not accurate. As such, the technology disclosed herein results in more efficient use of computing (processing) resources and in improved user experience.

Figure 1A:
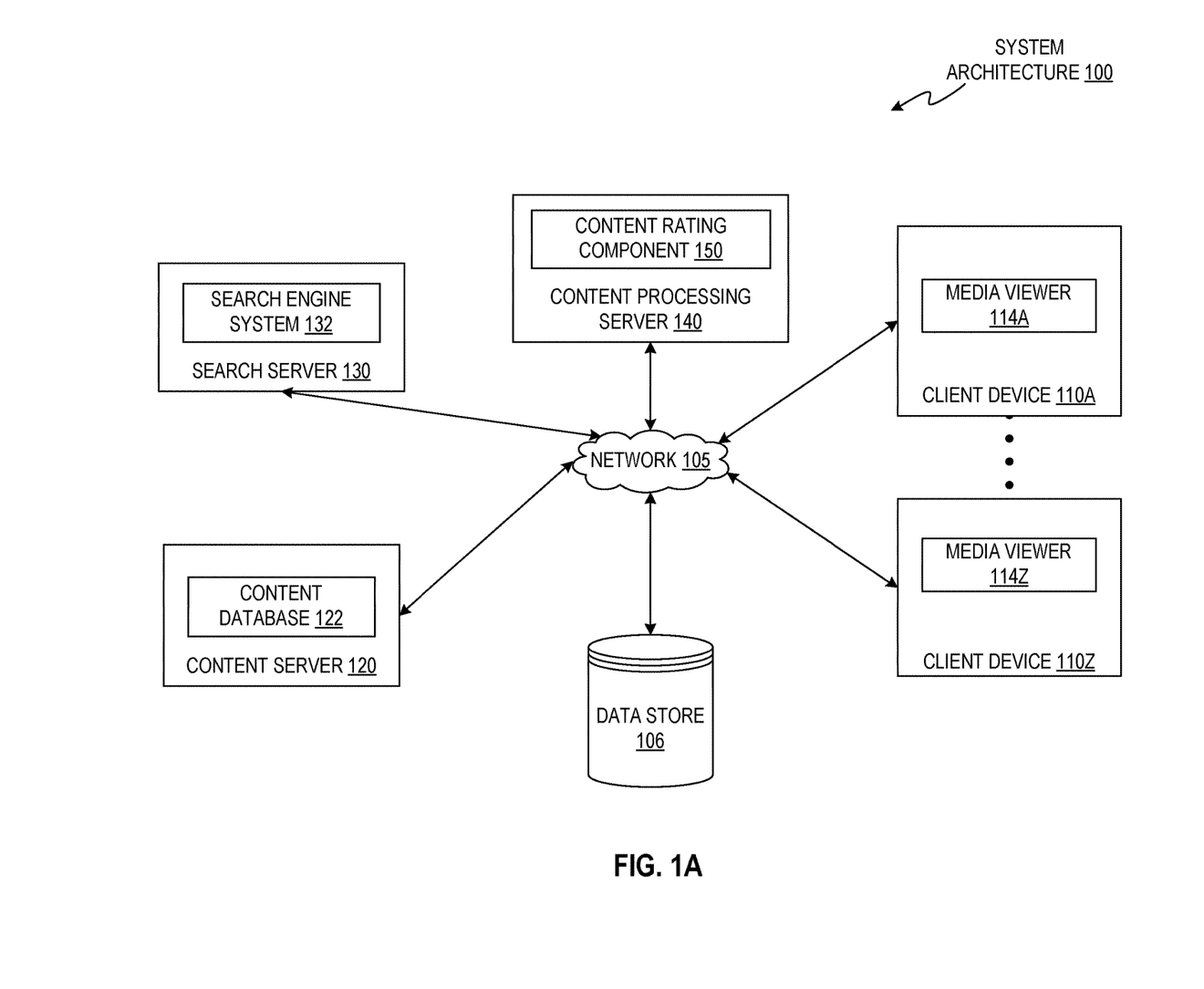
FIG. 1A illustrates an example system architecture in accordance with an implementation of the disclosure.

FIG. 1A illustrates an example system architecture 100, in accordance with an implementation of the disclosure, for selectively modifying scores of youth-oriented content search results. The system architecture 100 includes client devices 110A-110Z, a data store 106, a content server 120, a search server 130, and a content processing server 140, with each device of the system architecture 100 being communicatively coupled via a network 105. In one implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers). In some implementations, the data store 106 may be cloud-based. One or more of the devices of system architecture 100 may utilize the data store 106 to store public and private data, and the data store 106 may configured to provide secure storage for private data.

The content server 120 may represent a content sharing platform that may optionally also include the search server 130, the content processing server 140, the data store 106 or any combination of the above components. The content sharing platform may allow a user to consume, upload, search for, approve of ("like"), disapprove of ("dislike"), or comment on media items. The content sharing platform 120 may also include a website (e.g., a webpage) or application back-end software that may be used to provide a user with access to the media items.

The client devices 110A-110Z may each include computing devices such as personal computers (PCs), laptops, mobile phones, smart phones, tablet computers, netbook computers, etc. Client devices 110A-110Z may also be referred to as "user devices" or "mobile devices". An individual user may be associated with (e.g., own and/or use) one or more of the client devices 110A-110Z. The client devices 110A-110Z may each be owned and utilized by different users at different locations. As used herein, a "user" may be represented as a single individual (e.g., an adult or a child). However, other implementations of the disclosure encompass a "user" being an entity controlled by a set of users and/or an automated source. For example, a set of individual users federated as a community in a social network may be considered a "user".

The client devices 110A-110Z may each include a media viewer 111. In one implementation, the media viewers 111 may be applications that allow users to playback, view, or upload content, such as images, video items, web pages, documents, audio items, etc. For example, the media viewer 111 may be a web browser that can access, retrieve, present, or navigate content (e.g., web pages such as Hyper Text Markup Language (HTML) pages, digital media items, etc.) served by a web server. The media viewer 111 may render, display, or present the content (e.g., a web page, a media viewer) to a user. The media viewer 111 may also include an embedded media player (e.g., a Flash® player or an HTML5 player) that is embedded in a web page (e.g., a web page that may provide information about a product sold by an online merchant). In another example, the media viewer 111 may be a standalone application (e.g., a mobile application, or native application) that allows users to play digital media items (e.g., digital video items, digital images, electronic books, etc.). According to aspects of the disclosure, the media viewer 111 may be a content sharing platform application for users to record, edit, and/or upload content for sharing on the content sharing platform. As such, the media viewers 111 may be provided to the client devices 110A-110Z by content sharing platform 120. For example, the media viewers 111 may be embedded media players that are embedded in web pages provided by the content sharing platform 120. In another example, the media viewers 111 may be applications that are downloaded from content sharing platform 120.

The media viewer 111 may also provide a user interface (e.g., a web browser user interface or a mobile application user interface) to allow a user of a respective client device 110A-110Z to submit a search query (e.g., a string of text) to the search server 130, which may in turn provide a plurality of search results to the respective client device 110A-110Z. For example, if a user of the client device 110A submits a search query to the search server 130, the search server 130 may return a set of scored search results, which may be presented for display in the user interface as a ranked list. The user may select one of the search results in order to retrieve associated content (e.g., a document, a website, video content, an image, music, etc.) from the content server 120 (or the search server 130 may facilitate the retrieval of the content from the content server 120 on behalf of the client device 110A). FIGS. 1C and 1D discussed further below provide examples of user interfaces presenting search results.

In one implementation, the content server 120 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items, and/or provide the media items to the user. The content server 120 may be a server utilized by any of the client devices 110A-110Z or the search server 130 to retrieve/access content or information pertaining to content (e.g., content metadata including a title, a genre, a content label, etc.).

In some implementations, more than one content server 120 may be utilized, with some specializing in particular types of content (e.g., a first content server that hosts video content, another content server that hosts music, etc.). The content server 120 may host shared content, private content (e.g., content restricted to use by a single user or a group of users), commercially distributable content (e.g., on-demand content, purchasable content, etc.). In one implementation, the content server 120 maintains a content database 122, which includes records of available media items, including their titles, descriptions, ratings (e.g., including content labels such as "youth-oriented" and "general audience"), cross-references to related content or associated content, copyright information, licensing information, etc. In some implementations, the content server 120 may be combined with the search server 130 and/or the data store 106.

In one implementation, the search server 130 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to process a search queries received from the client devices 110A-110Z, generate lists of search results based on the search queries, and provide the search results to the requesting client devices 110A-110Z. The search server 130 includes a search engine system 132.

In one implementation, the search engine system 132 may receive a search query (e.g., from one of the client devices 110A-110Z) and generate a set of search results of media items relevant to the search query, which may be subsequently transmitted back to the client device from which the query originated. The search engine system 132 may search for media items related to the search query (e.g., by searching descriptions of content from the content database 122, searching the body of web documents on the content server 120 or data store 106, etc.), for example, using any suitable search algorithm. The search engine system 132 may generate a set of search results by identifying media items relevant to the search query and ranking the media items.

In some implementations, the search engine system 132 may restrict the search to find content associated with one or more specific content labels. In an illustrative implementation, the search engine system 132 performs a "joint" search in which the search is restricted to youth-oriented content and general audience content. In another illustrative implementation, the search engine system 132 performs two separate searches based on the search query: a first search restricted to youth-oriented content, and a second search restricted to general audience content. In each of these illustrative implementations (e.g., screening after identifying search results, a "joint" search, or separate searches), the content rating component 150 receives search results associated with a youth-oriented content label (e.g., "Y"-rated content, denoted by set Y) and/or a general audience content label (e.g., "Y"-rated content, denoted by set G).

In one implementation, the content processing server 140 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to process data search queries and/or content received from the search server 130 and/or the content server 120. The content processing server 140 may include a content rating component 150. In some embodiments, the content rating component 150 can include one or more modules illustrated in FIG. 1B.

The content rating component 150 can rate media items using one or more ratings. A rating may represent or be referred to as a content label. Each of the content labels may indicate a particular type of content and/or content suitable for particular audience. The content rating component 150 can associate each of the media items with one or more content labels (or ratings). Examples of content labels may include a content label indicative of youth-oriented content (e.g., a "Y"-rated label), a content label indicative of content suitable for general audience (e.g., a "G"-rated label), a content label indicative of content to be consumed by certain audience with parental guidance (e.g., a "PG"-rated label), a content label indicative of content suitable for teenager audience (e.g., a "TEEN"-rated label), and a content label indicative of "X" (adult/X-rated) content. Media items associated with one or more particular content labels may be regarded as being "safe" for particular audience. For example, both "Y"-rated (e.g., youth-oriented) and "G"-rated (e.g., general audience) content is generally considered to be safe for children.

In some embodiments, the content rating component 150 may receive search query data from one or more of content server 120, search server 130, data store 106, and/or any other device for media content rating. The search query data may include any suitable data related to one or more search queries submitted to one or more of content server 120 and search server 130 by one or more users. For example, the search query data can include the search queries (e.g., strings, images, and/or any other content included in each of the search queries). As another example, the search query data can include data about one or more search results corresponding to each of the search queries. Each of the search results may correspond to one or more media items (e.g., videos, images, etc.). The search query data may also include data about each of the media items, such as a content label (or rating) associated with each of the media items (also referred to as the "initial content label"), a link to each of the media items, one or more user interactions with the media items, etc. In one implementation, the search query data may include data about one or more search queries submitted during a certain period of time (e.g., the prior day, the last few hours, the last few days, etc.). In another implementation, the search query data may include data about one or more particular search queries, such as one or more search queries specified by a user, one or more search queries containing specific keywords, search queries with a threshold number of search results, etc.

The content rating component 150 can perform media content rating based on the search query data. For example, the content rating component 150 can determine, for each of the search queries related to the search query data, whether one or more media items are rated incorrectly and change the content labels (or ratings) of the media items. For example, for a particular search query, the content rating component 150 can determine whether the search query represents a request for particular media content (e.g., media content associated with a particular content label, such as an "X"-rated label). The content rating component 150 can then change the content labels of media items associated with search results of the search query based on the determination. For example, in response to determining that the search query represents a request for the particular media content (e.g., "X"-rated videos), the content rating component 150 can assign the particular content label to one or more media items that were previously associated with another content label (e.g., a "Y"-rated label, a "G"-rated label). As another example, in response to determining that the search query does not represents a request for the particular media content, the content rating component 150 may assign a new content label (e.g., a "Y"-rated label, a "G"-rated label) to one or more of the media items that were previously associated with the particular content label.

Each of the search queries related to the search query data may be classified, for example, by performing one or more operations described in connection with FIGS. 2-3 below. As an example, the content rating component 150 can analyze every search query related to the search query data, tallying the number of selections of (e.g., by clicking or tapping on) "safe"-rated and "X"-rated videos in search results of a respective search query, from every time any user issued that search query. Then, for each search query, the content rating component 150 can calculate the unsafe selection weight factor as (X video selections)/(safe video selections+X video selections). The content rating component 150 can also keep track of the total number of X-rated videos selected for each search query. For example, a search query "sex" may be issued 100 times during a time period according to the search query data. The content rating component 150 may determine that the following user interactions (e.g., selection counts) based on the search query data:

X_video1—clicked 30 times
X_video2—clicked 50 times
X_video3—clicked 15 times
Safe_video1—clicked 5 times.

The content rating component 150 can determine that the unsafe selection weight factor is 0.95 (95 X clicks/(5 safe clicks+95 X clicks)) for the search query "sex." The content rating component 150 may also determine that the number of X videos related to the search query "sex" is 3. The content rating component 150 may also determine a first threshold representative of the minimum unsafe selection weight factor and a second threshold representative of the minimum X video count. In this example, if the minimum unsafe selection weight factor is 0.9 and the minimum X video count is 1, Safe_video1 may be relabeled as an X video.

Although each of content server 120, search server 130, content processing server 140, and data store 106 are depicted in FIG. 1A as single, disparate components, these components may be implemented together in a single device or networked in various combinations of multiple different devices that operate together. Examples of such devices may include, but are not limited to, servers, mainframe computers, networked computers, process-based devices, and similar types of systems and devices. Some implementations of the disclosure may operate within a single server device or on multiple server devices. Other implementations of the disclosure may operate in a standalone system. In some implementations, one or more of the content server 120, the search server 130, or the content processing server 140 are managed by a single entity. In some implementations, one or more of the content server 120, the search server 130, and the content processing server 140 are managed by different entities.

In general, functionality described in one implementation as being performed by the content server 120, the search server 130, and/or the content processing server 140 can also be performed by any of the client devices 110A-110Z in other implementations where appropriate. For example, the client device 110A may implement a software application that performs the functions of the content rating component 150. In addition, the functionality attributed to a particular component can be performed by different or multiple components operating together. The content server 120, the search server 130, and/or the content processing server 140 can also be accessed as services provided to other systems or devices through appropriate application programming interfaces, and thus are not limited to use in websites.

Figure 1B:
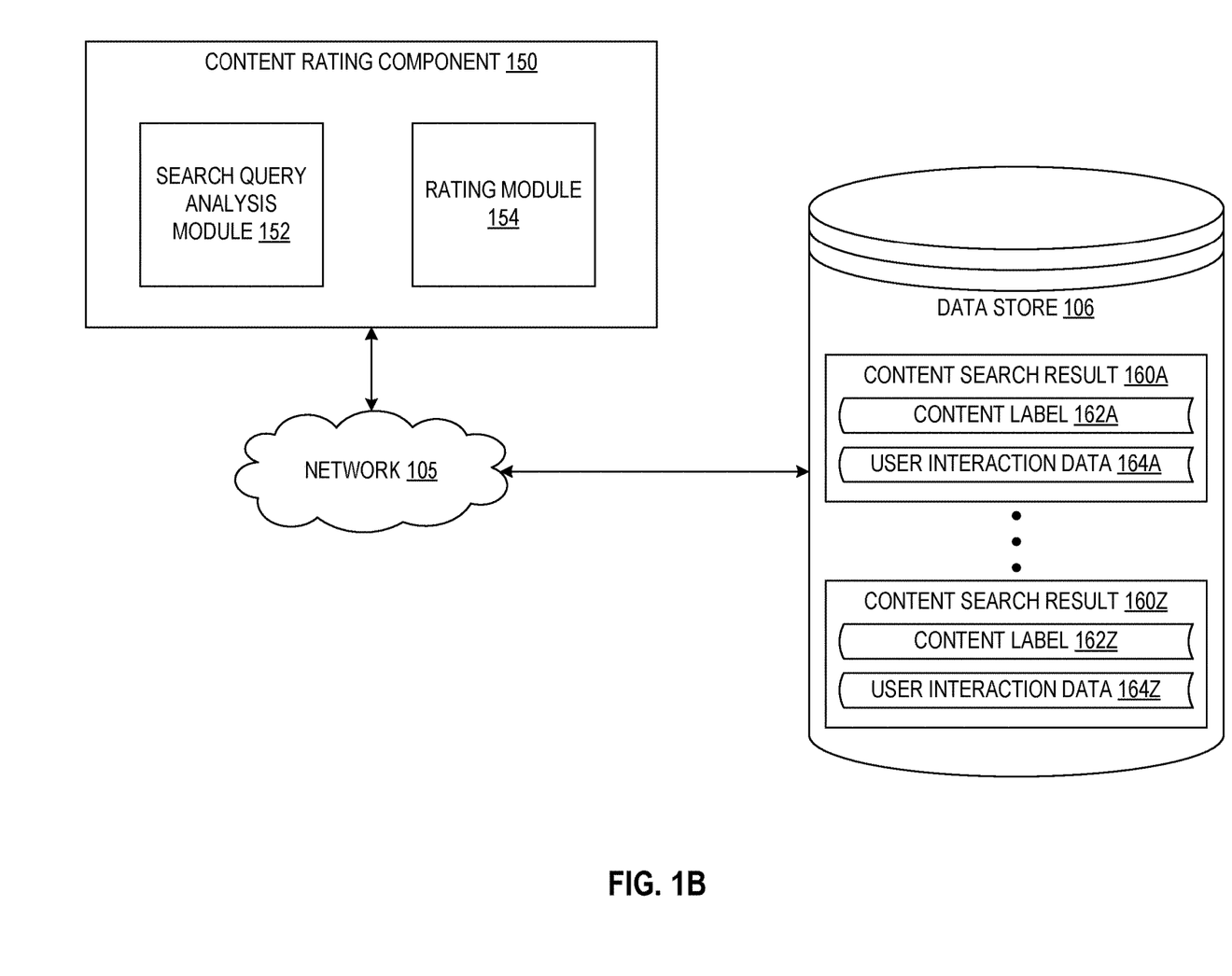
FIG. 1B is a block diagram illustrating a content rating component in accordance with an implementation of the disclosure.
Figure 1C:
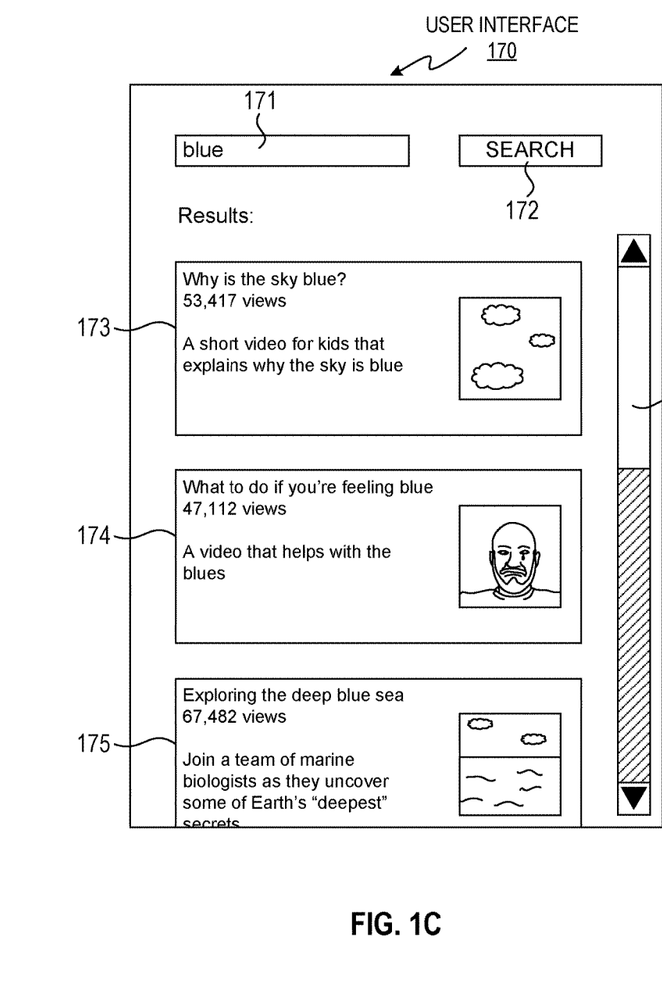
FIGS. 1C and 1D illustrate example user interfaces presenting search results in accordance with an implementation of the disclosure.
Figure 1D:
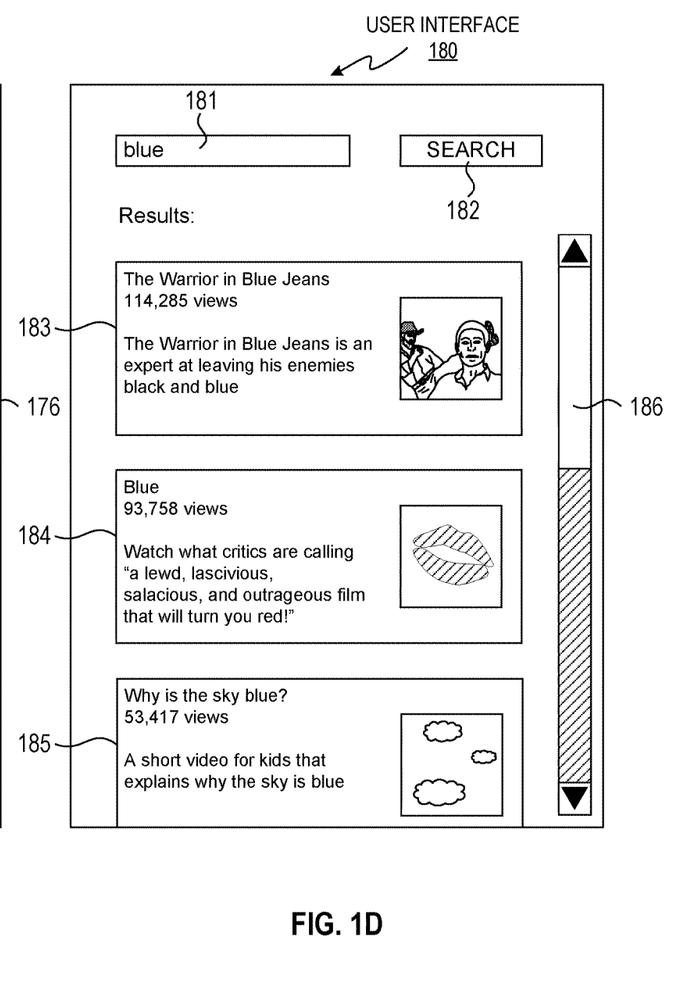

FIG. 1B is a block diagram illustrating a content rating component in accordance with an implementation of the disclosure. In one implementation, the content rating component 150 may include a search query analysis module 152 and a rating module 154. More or fewer components may be included in the content rating component 150 without loss of generality. For example, two or more of the modules may be combined into a single module, or one of the modules may be divided into two or more modules. In one implementation, one or more of the modules may reside on different computing devices (e.g., different server computers, on a single client device, distributed among multiple client devices, etc.).

In one implementation, the content rating component 150 is communicatively coupled to the data store 106. For example, the content rating component 150 may be coupled to the data store 106 via a network (e.g., via network 105 as illustrated in FIGS. 1A and 1B). In another example, the scoring component 150 may be coupled directly to a server where the content rating component 150 resides (e.g., may be directly coupled to the search server 130). As described with respect to FIG. 1A, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers), and may be cloud-based. Data store 106 may be part of or distributed between any of the client devices 110A-110Z, the content server 120, the search server 130, and the content processing server 140, as described with respect to FIG. 1A.

In one implementation, the data store 106 includes content search results 160A-160Z corresponding to retrievable media items identified (e.g., by the search engine system 132) as residing on the content server 120 or on any other content source. Each of the content search results 160A-160Z may have been generated by the search engine system 132, with each including, respectively, content labels 162A-162Z (e.g., which may have been previously assigned to their respective media items and stored in the content database 122) and user interaction data 164A-164Z. In one implementation, the content search results 160A-160Z may be stored on a search server (e.g., the search server 130) and/or a content server (e.g., the content server 120). In some embodiments, the content search results 160A-160Z may be part of the search query data as described in accordance with the present disclosure.

The user interaction data 164A-164Z may be and/or include data about user interactions with media items associated with content search results 160A-160Z. For example, each of user interaction data 164A-164Z may include data (e.g., a flag) indicative of whether a corresponding search result 160A-160A is interacted (e.g., "selected") by any user. As another example, user interaction data 164A-164Z may include data about one or more user interactions by one or more users with the search results 160A-160Z and/or media items associated with the search results 160A-160Z. The users may be and/or include users that submitted a search query related to the search results 160A-160Z. Examples of a user interaction with a media item and/or a search result may be, for example, a selection of the media item and/or the search result related to the media item and/or the search result (e.g., by "clicking," "tapping," etc.), consumption of one or more portions of the media item, commenting on the media item, recommending (e.g., "liking") the media item, sharing the media item, etc.

The search query analysis module 152 can analyze the content search results 160A-160Z for media content rating. For example, the search query analysis module 152 can determine one or more first media items associated with a first content label (e.g., an "X"-rated content label) and one or more first user interactions with the first media items. The first user interactions may include, for example, a user selection of one or more search results 160A-160Z related to the first media items. The search query analysis module 152 can also analyze the content search results 160A-160Z to determine one or more second media items that are not associated with the first content label (e.g., media items with a second content label indicative of "G"-rated content, a third content label indicative of "Y-rated content, etc.) and one or more second user interactions with the second media items. The second user interactions may include, for example, a user selection of one or more search results 160A-160Z related to the second media items.

The rating module 154 can determine whether the search query represents a request for media content associated with the first content label based on the first user interactions and/or the second user interactions. For example, the rating module 154 can determine a weight factor representative of a percentage of the first user interactions in the user interactions with the media items associated with the search query. In some embodiments, the weight factor may be determined by calculating a ratio of the number of the first user interactions to the number of the user interactions with the first media items and the second media items. The rating module 154 can then compare the weight factor with a first threshold. The rating module 154 can also compare the number of the first media items with a second threshold. In some embodiments, in response to determining that the weight factor is greater than the first threshold and/or that the number of the first media items is greater than the second threshold, the rating module 154 can determine that the search query represents a request for media content associated with the particular label. The rating module 154 can then change the rating of the second media items by associating the second media items with the first content label. The rating module 154 can also change the rating of the first media items in response to determining that the search query does not represent a request for media content associated with the first content label. For example, the rating module 154 can associate the first media items with the second media item and/or the third media item. In some embodiments, content labels 162A-162Z may be updated based on the above changes.

In some embodiments, the rating module 154 can determine values of the first threshold and/or the second threshold. For example, the rating module 154 can generate a training set of a plurality of media items of known content and determine a percentage of media items associated with the first content label in the training set. The rating module 154 can determine a value of the first threshold based on the determined percentage. As another example, the rating module 154 can determine a value of the second threshold based on the number of the media items that are associated with the first content label in the training set. In some embodiments, the percentage of media items associated with the first content label in the training set and/or the number of the media items that are associated with the first content label may be determined based on user inputs (e.g., a user input indicating a particular media item as content related to the first content label).

The content rating component 150 is described as being implemented by the content processing server 140, but may be implemented by any of the client devices 110A-110Z, the content server 120, and/or the search server 130. For example, a client device (e.g., client device 110A) may be programmed to perform all of the functions of the scoring component 150. When the content rating component 150 is implemented on a client device, any functions described with respect to the content rating component 150 that "receive," "transmit," "retrieve," "identify," "determine," "analyze," "process," etc., are understood to refer to functions performed by sub-systems or sub-modules within the client device rather than across a network (e.g., the network 105), as would be appreciated by one of ordinary skill in the art.

FIG. 1C illustrates an example user interface 170 presenting search results related to particular content labels in accordance with an implementation of the disclosure. For example, the user interface 170 may correspond to a user interface provided by one of the respective media viewers 114A-114Z of the client devices 110A-110Z. The user interface 170 includes a search box 171 for entering a search string (e.g., "blue"), and a search button 172 that causes a search request for "blue" to be transmitted to a search engine (e.g., the search engine system 132). The search results 173-175 are displayed, and a scrollbar 176 indicates the availability of additional search results below. As illustrated, the search results for "blue" include youth-oriented content and general audience content. For example, the search results 173 and 174 are videos specifically designed for a young audience, while the search result 175 corresponds to content that would be safe for a general audience. The search results 173 and 174 may have been promoted to the top of the search results 173-175 based on one or more boosts applied to their respective scores.

FIG. 1D illustrates an example user interface 180 presenting search results in accordance with some implementations of the disclosure. The user interface 180 includes a search box 181, a search button 182, a scrollbar 186, and search results 183-185. The search results 183-185 illustrated correspond to potential search results that may be generated if no youth-oriented or general audience restrictions applied and youth-oriented search result scores are not selectively modified. For example, the top search result 183, while relevant, may be unsuitable for children due to the nature of its content. The search result 184 may be considered adult content, and may or may not be present depending on whether an adult content filter is utilized. The search result 185 may correspond to the same content as the search result 173, except its score is comparatively lower than the search results 183 and 184 in this example.

Figure 2:
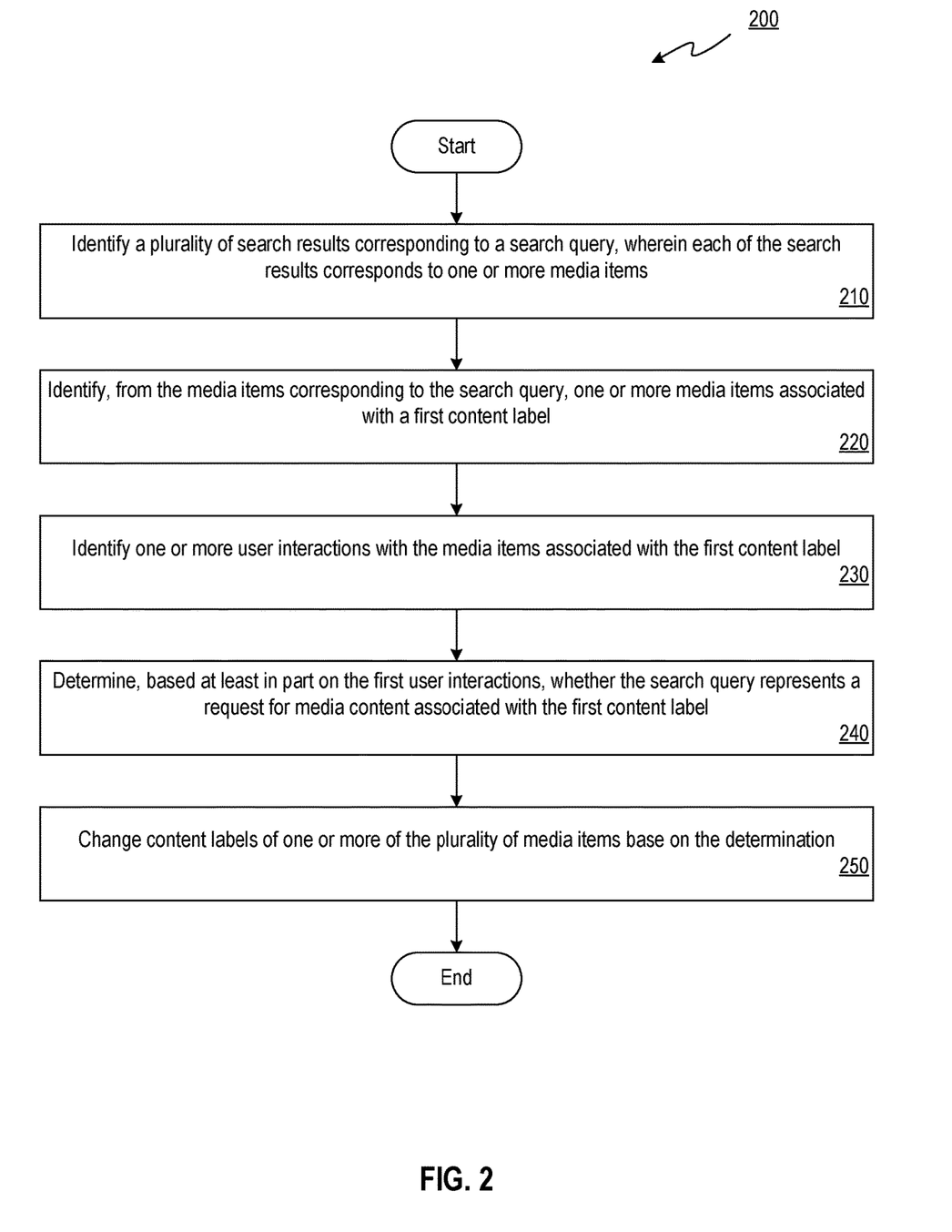
FIG. 2 is a flow diagram illustrating a method for rating media content in accordance with an implementation of the disclosure.

FIG. 2 is a flow diagram illustrating a method 200 for rating media content in accordance with an implementation of the disclosure. FIG. 3 is a flow diagram illustrating a method 300 for modifying rating of media content in accordance with an implementation of the disclosure. The methods 200 and 300 may be performed by processing logic that includes hardware (e.g., circuitry, dedicated logic, programmable logic, microcode, etc.), software (e.g., instructions run on a processing device to perform hardware simulation), or a combination thereof. In one implementation, the methods 200 and 300 may each be performed by a processing device executing the content rating component 150 described with respect to FIGS. 1A and 1B.

Referring to FIG. 2, the method 200 begins at block 210 when a processing device may identify a plurality of search results corresponding to a search query. Each of the search results may correspond to one or more media items. Each of the media items and/or the search results may be associated with a predetermined content label. The search queries may be issued on one or more search servers, content servers, and/or and any other platform by one or more users. The search results may be identified, for example, based on search query data related to one or more search queries issued on the search server and/or content servers. The search query data may include data about search results as described in connection with FIGS. 1A-1B.

At block 220, the processing device can identify, from the media items associated with the search query, one or more media items associated with a first content label (also referred to as the "first plurality of media items"). For example, the processing device can determine, based on the search query data, one or more media items associated with an "X"-rated label.

At block 230, the processing device can identify one or more user interactions with the media items associated with the first content label. For example, the processing device can determine a particular user interaction with each of the first plurality of media items (e.g., a user selection of a first media item or a search result related to the first media item). As another example, the processing device can determine the number of user interactions (e.g., the number of "clicks") with each of the first plurality of media items.

At block 240, the processing device can determine, based at least in part on the first user interactions, whether the search query represents a request for media content associated with the first content label. For example, the processing device can determine the number of the first user interactions and the number of overall user interactions with the media items associated with the search query. The processing device can then determine a weight factor representative of a ratio of the first user interactions to the user interactions with the media items associated with the search query. The processing device can determine that the search query represents a request for media content associated with the first content label in response to determining that the weight factor is greater than a first threshold. Similarly, the processing device can determine that the search query does not represent a request for media content associated with the first content label in response to determining that the weight factor is not greater than the first threshold.

As another example, the processing device can determine whether the number of the first plurality of media items is greater than a second threshold. In some embodiments, the processing device can determine that the search query represents a request for media content associated with the first content label in response to determining that the number of the first plurality of media items is greater than a second threshold. Similarly, the processing device can determine that the search query does not represent a request for media content associated with the first content label in response to determining that the number of the first plurality of media items is not greater than the second threshold.

As still another example, the processing device can determine that the search query represents a request for media content associated with the first content label in response to determining that the weight factor is greater than the first threshold and that the number of the first plurality of media items is not greater than the second threshold. In some embodiments, the processing device can determine whether the search query represents a request for media content associated with the first content label by performing one or more operations described in connection with FIG. 3 below.

In some embodiments, at block 250, the processing device can change labels of one or more of the plurality of media items base on the determination. For example, in response to determining that the search query represents the request for media content associated with the first content label, the processing device can re-rate a second media item associated with a second content label (e.g., a "Y"-rated content label, a "G"-rated content label). More particularly, for example, the processing device can associate the second media item with the first content label. Alternatively, the processing device can re-rate the first plurality of media items in response to determining that the search query does not represent the request for media content associated with the first content label. More particularly, for example, the processing device can associate the first plurality of media items with one or more other content labels that are different from the first content label (e.g., the second content label).

Figure 3:
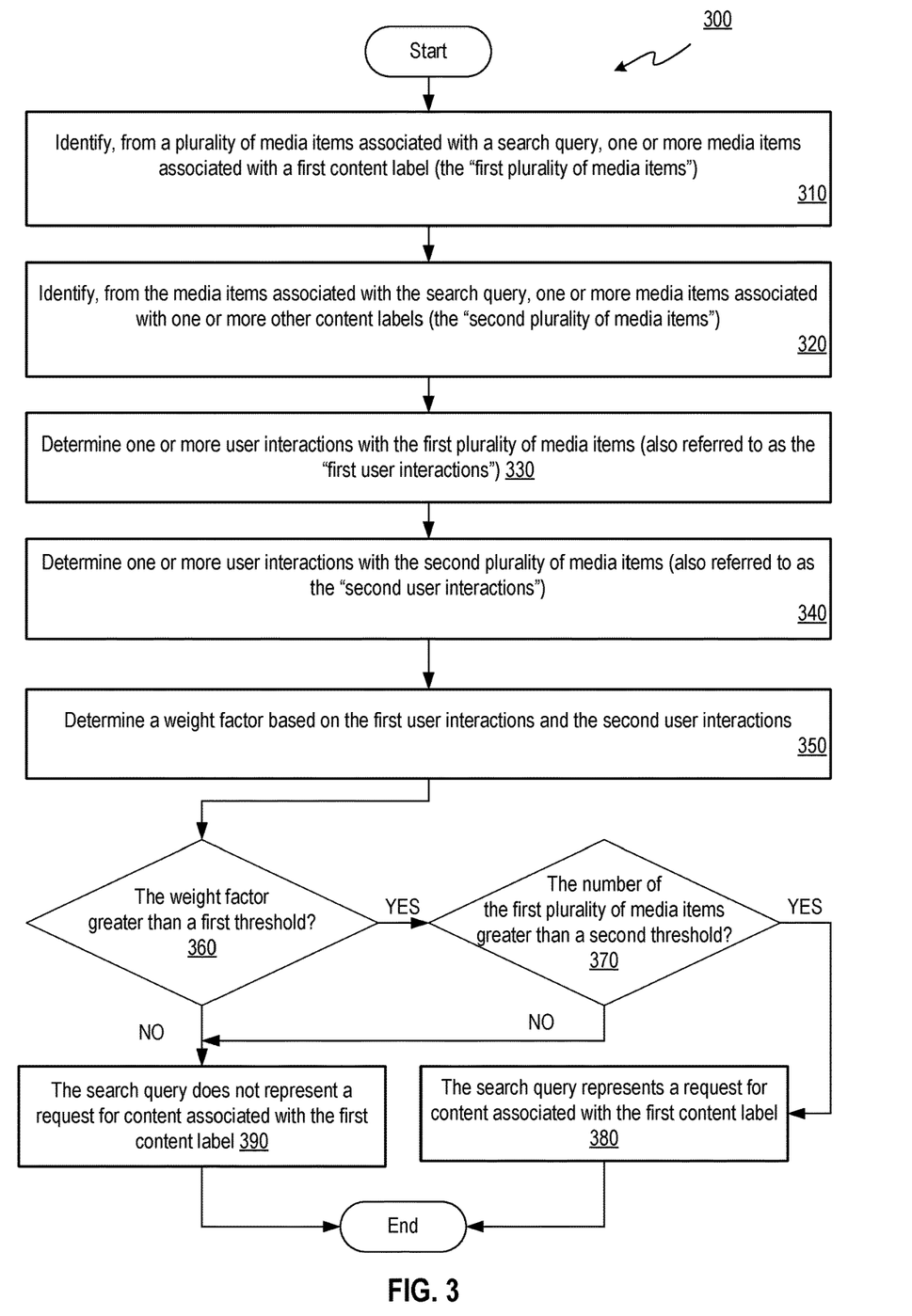
FIG. 3 is a flow diagram illustrating a method for modifying rating of media items in accordance with an implementation of the disclosure.

Referring to FIG. 3, method 300 begins at block 310 when a processing device may identify, from a plurality of media items associated with a search query, one or more media items associated with a first content label (also referred to as the "first plurality of media items"). The first content label may be, for example, an "X" content rating indicative of adult content, explicit content, etc. Block 310 may be performed in a substantially similar manner as block 220, as described with respect to FIG. 2.

At block 320, the processing device can identify, from the media items associated with the search query, one or more media items associated with one or more other content labels (also referred to as the "second plurality of media items"). The second media items may be associated with any content identifier that is different from the first content identifier. For example, the second media items may include one or more media items associated with a second content label of youth-oriented content (e.g., a "Y" rating). As another example, the second media items may include one or more media items associated with a third content label associated with content directed to general audience (e.g., a "G" rating). In some embodiments, the second media items may be regarded as being "safe" content for particular users (e.g., children).

At block 330, the processing device can determine one or more user interactions with the first plurality of media items (also referred to as the "first user interactions"). For example, the processing device can determine particular types of interactions by one or more users with the first media items, such as a user selection of one of the first media items, user consumption of one of the first media items for a particular period of time, sharing of one of the first media items, etc.

At block 340, the processing device can determine one or more user interactions with the second plurality of media items (also referred to as the "second user interactions"). For example, the processing device can determine particular types of interactions by one or more users with one or more of the second plurality of media items, such as a user selection of one of the second plurality of media items, user consumption of one of the second plurality of media items for a particular period of time, sharing of one of the second plurality of media items, etc.

At block 350, the processing device can determine a weight factor based on the first user interactions and the second user interactions. For example, the processing device can determine the number of the first user interactions (also referred to the "first number") and the number of the second user interactions (also referred to the "second number"). The processing device can determine the weight factor by calculating a ratio of the first number to a sum of the first number and the second number.

At block 360, the processing device can determine whether the weight factor is greater than a first threshold. In some embodiments, in response to determining that the weight factor is greater than the first threshold, the processing device can proceed to 370 and can determine whether the number of the first plurality of media items is greater than a second threshold. The value of the second threshold may be one, two, or any other suitable value. In response to determining that the number of the first plurality of media items is greater than the second threshold, the processing device can determine that the search query represents a request for media content associated with the first content identifier at block 380. Alternatively, the processing device can determine that the search query does not represent a request for media content associated with the first content identifier at block 390 in response to determining that the first number is not greater than the second threshold and/or that the weight factor is not greater than the first threshold.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture", as used herein, is intended to encompass a computer program accessible from any computer-readable device or storage media.

Although implementations of the disclosure were discussed in terms of selectively modifying scores of content search results, the implementations may also be generally applied to any system in which sets of data within larger sets of data are to be selectively adjusted/modified. Thus, implementations of the disclosure are not limited to content search results.

Figure 4:
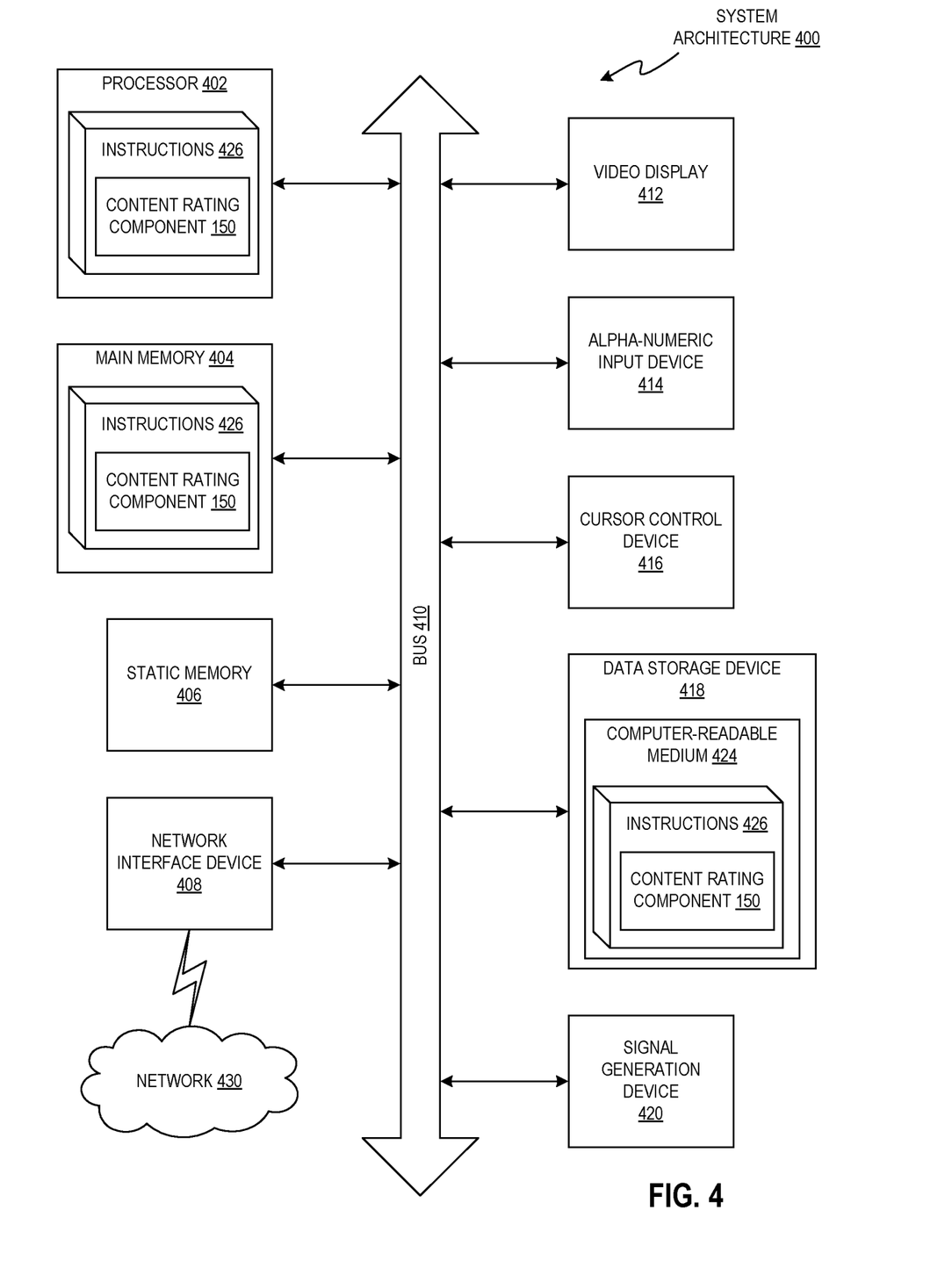
FIG. 4 is a block diagram illustrating an exemplary computer system in accordance with an implementation of the disclosure.

FIG. 4 illustrates a diagrammatic representation of a machine in the exemplary form of a computer system 400 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Some or all of the components of the computer system 400 may be utilized by or illustrative of any of the client devices 110A-110Z, the data store 106, the content server 120, the search server 130, and the content processing server 140.

The exemplary computer system 400 includes a processing device (processor) 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 410.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute instructions 426 for performing the operations and steps discussed herein.

The computer system 400 may further include a network interface device 408. The computer system 400 also may include a video display unit 412 (e.g., a liquid crystal display (LCD), a cathode ray tube (CRT), or a touch screen), an alphanumeric input device 414 (e.g., a keyboard), a cursor control device 416 (e.g., a mouse), and a signal generation device 420 (e.g., a speaker).

The data storage device 418 may include a computer-readable storage medium 424 on which is stored one or more sets of instructions 426 (e.g., software) embodying any one or more of the methodologies or functions described herein. The instructions 426 may also reside, completely or at least partially, within the main memory 404 and/or within the processor 402 during execution thereof by the computer system 400, the main memory 404 and the processor 402 also constituting computer-readable storage media. The instructions 426 may further be transmitted or received over a network 430 (e.g., the network 105) via the network interface device 508.

In one implementation, the instructions 426 include instructions for one or more content rating components 150, which may correspond to the identically-named counterpart described with respect to FIGS. 1A and 1B. While the computer-readable storage medium 424 is shown in an exemplary implementation to be a single medium, the terms "computer-readable storage medium" or "machine-readable storage medium" should be taken to include a single medium or multiple media (e.g., a centralized or distributed database, and/or associated caches and servers) that store the one or more sets of instructions. The terms "computer-readable storage medium" or "machine-readable storage medium" shall also be taken to include any transitory or non-transitory medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description may have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "receiving", "transmitting", "generating", "adding", "processing", "classifying", "reclassifying", "searching", "associating", "assigning", "analyzing", "determining", "enabling", "identifying", "rating", "rerating", "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus, device, or system for performing the operations herein. This apparatus, device, or system may be specially constructed for the required purposes, or it may include a general purpose computer selectively activated or reconfigured by a computer program stored in the computer. Such a computer program may be stored in a computer- or machine-readable storage medium, such as, but not limited to, any type of disk including floppy disks, optical disks, compact disk read-only memories (CD-ROMs), and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Reference throughout this specification to "an implementation" or "one implementation" means that a particular feature, structure, or characteristic described in connection with the implementation is included in at least one implementation. Thus, the appearances of the phrase "an implementation" or "one implementation" in various places throughout this specification are not necessarily all referring to the same implementation.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   identifying, by a processing device, a plurality of search results corresponding to a search query, the plurality of search results corresponding to a plurality of media items resulting from the search query;
   determining, by the processing device, that the plurality of media items resulting from the search query have different content labels comprising a first content label and a second content label that is distinct from the first content label;
   determining that at least one of the plurality of media items resulting from the search query has been labeled incorrectly, wherein determining that at least one of the plurality of media items resulting from the search query has been labeled incorrectly comprises:
      identifying, by the processing device, at least one first media item of the plurality of media items with the first content label and a second media item of the plurality of media items with the second content label; and
      determining, based at least in part on a first user interaction with the first media item, that the search query represents a request for media content associated with the first content label, wherein determining that the search query represents the request for the media content associated with the first content item indicates that the second media item has been labeled incorrectly and that the first content label provides a more accurate representation of media content of the second media item than the second content label; and
   modifying, by the processing device, labeling of the second media item from the second content label to the first content label.

2. The method of claim 1, wherein determining that the search query represents the request for media content associated with the first content label comprises:
   identifying at least one second user interaction with the second media item; and
   determining, based at least in part on the first user interaction and the second user interaction, that the search query represents the request for media content associated with the first content label.

3. The method of claim 2, wherein determining that the search query represents the request for media content associated with the first content label comprises:
   determining a first number of user interactions with the first media item;
   determining a second number of user interactions with the second media item; and
   determining, based at least in part on the first number and the second number, that the first search query represents a request for media content associated with the first content label.

4. The method of claim 3, further comprising:
   determining a weight factor representative of a ratio of the first number to a sum of the first number and the second number; and
   comparing the weight factor with a first threshold.

5. The method of claim 3, wherein determining that the search query represents the request for media content related to the first content label comprises:
   identifying, from the plurality of media items resulting from the search query, a third number of media items that are associated with the first content label; and
   determining that the third number is greater than a second threshold.

6. The method of claim 1, further comprising associating the first media item with the second content label in response to determining that the search query does not represent the request for media content associated with the first content label.

7. The method of claim 1, wherein the first content label indicates an age appropriate content rating, and wherein the second content label indicates an age inappropriate content rating.

8. A system comprising:
a memory; and
a processing device communicatively coupled to the memory, wherein the processing device is to:
identify a plurality of search results corresponding to a search query, the plurality of search results corresponding to a plurality of media items resulting from the search query;
determine that the plurality of media items resulting from the search query have different content labels comprising a first content label and a second content label that is distinct from the first content label;
determine that at least one of the plurality of media items resulting from the search query has been labeled incorrectly, wherein to determine that at least one of the plurality of media items resulting from the search query has been labeled incorrectly, the processing device is further to:
identify at least one first media item of the plurality of media items with the first content label and a second media item of the plurality of media items with the second content label; and
determine, based at least in part on a first user interaction with the first media item, that the search query represents a request for media content associated with the first content label, wherein determining that the search query represents the request for the media content associated with the first content item indicates that the second media item has been labeled incorrectly and that the first content label provides a more accurate representation of media content of the second media item than the second content label; and
modify labeling of the second media item from the second content label to the first content label.

9. The system of claim 8, wherein, to determine that the search query represents the request for media content associated with the first content label, the processing device is further to:
identify at least one second user interaction with the second media item; and
determine, based at least in part on the first plurality of user interactions and the second user interaction, that the search query represents the request for media content associated with the first content label.

10. The system of claim 8, wherein to determine that the search query represents the request for media content associated with the first content label, the processing device is further to:
determine a first number of user interactions with the first media item;
determine a second number of user interactions with the second media item; and
determine, based at least in part on the first number and the second number, that the first search query represents a request for media content associated with the first classifier.

11. The system of claim 10, wherein the processing device is further to:
determine a weight factor representative of a ratio of the first number to a sum of the first number and the second number; and
compare the weight factor with a first threshold.

12. The system of claim 10, wherein to determine that the search query represents the request for media content associated with the first content label, the processing device is further to:
identify, from the plurality of media items resulting from the search query, a third number of media items that are associated with the first content label; and
determine that the third number is greater than a second threshold.

13. The system of claim 8, wherein the processing device is further to associate the first media item with the second content label in response to determining that the search query does not represent the request for media content associated with the first content label.

14. A non-transitory machine-readable medium having instructions encoded thereon that, when executed by a processing device, cause the processing device to:
identify a plurality of search results corresponding to a search query, the plurality of search results corresponding to a plurality of media items resulting from the search query;
determine that the plurality of media items resulting from the search query have different content labels comprising a first content label and a second content label that is distinct from the first content label;
determine that at least one of the plurality of media items resulting from the search query has been labeled incorrectly, wherein to determine that at least one of the plurality of media items resulting from the search query has been labeled incorrectly, the processing device is further to:
identify at least one first media item of the plurality of media items with the first content label and a second media item of the plurality of media items with the second content label; and
determine, based at least in part on a first user interaction with the first media item, that the search query represents a request for media content associated with the first content label, wherein determining that the search query represents the request for the media content associated with the first content item indicates that the second media item has been labeled incorrectly and that the first content label provides a more accurate representation of media content of the second media item than the second content label; and
modify labeling of the second media item from the second content label to the first content label.

15. The non-transitory machine-readable medium of claim 14, wherein, to determine that the search query represents the request for media content associated with the first content label, the processing device is further to:
identify at least one second user interaction with the second media item; and
determine, based at least in part on the first plurality of user interactions and the second user interaction, that the search query represents the request for media content associated with the first content label.

16. The non-transitory machine-readable medium of claim 14, wherein to determine that the search query represents the request for media content associated with the first content label, the processing device is further to:
determine a first number of user interactions with the first media item;
determine a second number of user interactions with the second media item; and
determine, based at least in part on the first number and the second number, that the first search query represents a request for media content associated with the first classifier.

17. The non-transitory machine-readable medium of claim 16, wherein the processing device is further to:

determine a weight factor representative of a ratio of the first number to a sum of the first number and the second number; and compare the weight factor with a first threshold.

18. The non-transitory machine-readable medium of claim 17, wherein to determine that the search query represents the request for media content associated with the first content label, the processing device is further to:

identify, from the plurality of media items resulting from the search query, a third number of media items that are associated with the first content label; and determine that the third number is greater than a second threshold.

19. The non-transitory machine-readable medium of claim 14, wherein the processing device is further to associate the first media item with the second content label in response to determining that the search query does not represent the request for media content associated with the first content label.

20. The non-transitory machine-readable medium of claim 14, wherein the first content label indicates an age appropriate content rating, and wherein the second content label indicates an age inappropriate content rating.

\* \* \* \* \*